(12) United States Patent
Adzic

(10) Patent No.: US 10,516,308 B2
(45) Date of Patent: Dec. 24, 2019

(54) ROTOR FOR AN ELECTRIC MOTOR, ELECTRIC MOTOR, DRIVE FOR A VEHICLE, AND HYBRID OR ELECTRIC VEHICLE

(71) Applicant: VOLKSWAGEN AKTIENGESELLSCHAFT, Wolfsburg (DE)

(72) Inventor: Ljubomir Adzic, Kassel (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 201 days.

(21) Appl. No.: 15/586,327

(22) Filed: May 4, 2017

(65) Prior Publication Data

US 2017/0324288 A1 Nov. 9, 2017

(30) Foreign Application Priority Data

May 4, 2016 (DE) .................. 10 2016 207 800

(51) Int. Cl.
| | | |
|---|---|---|
| *H02K 1/27* | (2006.01) | |
| *B60L 11/18* | (2006.01) | |
| *B60L 50/50* | (2019.01) | |

(52) U.S. Cl.
CPC ............ *H02K 1/2706* (2013.01); *B60L 50/50* (2019.02); *H02K 1/2766* (2013.01); *B60L 2220/50* (2013.01); *Y02T 10/641* (2013.01); *Y02T 10/7005* (2013.01)

(58) Field of Classification Search
CPC ... B60L 11/18; B60L 2220/50; H02K 1/2706; H02K 1/2766; Y02T 10/641; Y02T 10/7005

USPC ...................................................... 310/156.01
See application file for complete search history.

(56) References Cited

U.S. PATENT DOCUMENTS

| | | | | |
|---|---|---|---|---|
| 4,924,130 A * | 5/1990 | Fratta | ................... | H02K 1/2766 310/156.53 |
| 7,196,446 B2 * | 3/2007 | Hans | ................... | H02K 1/2766 310/156.53 |
| 9,083,219 B2 * | 7/2015 | Choi | ................... | H02K 1/2773 |
| 9,273,691 B2 | 3/2016 | Yamada et al. | | |
| 2008/0224558 A1 * | 9/2008 | Ionel | ..................... | H02K 1/276 310/156.57 |
| 2010/0171386 A1 | 7/2010 | Kogure et al. | | |

(Continued)

FOREIGN PATENT DOCUMENTS

| | | |
|---|---|---|
| DE | 112008001333 T5 | 4/2010 |
| DE | 102012021109 A1 | 5/2013 |

(Continued)

*Primary Examiner* — Alex W Mok
(74) *Attorney, Agent, or Firm* — Laurence A. Greenberg; Werner H. Stemer; Ralph E. Locher

(57) ABSTRACT

A rotor for an electric motor which includes permanent magnets is formed so that the possibility of demagnetization of the permanent magnets is reduced. The rotor has at least one permanent magnet embedded in a magnetically conductive rotor core, and at least one flux path in the rotor core, for a magnetic flux caused by a magnetic stator field generated by a stator of the electric motor. The rotor core is realized, with respect to at least one of the flux paths, with a magnetically conductive shunt that bridges at least one of the permanent magnets for the magnetic flux that is caused by the stator field.

13 Claims, 6 Drawing Sheets

(56) References Cited

U.S. PATENT DOCUMENTS

| | | | | |
|---|---|---|---|---|
| 2011/0198959 A1* | 8/2011 | Vyas | ................... | B60L 11/1803 |
| | | | | 310/156.21 |
| 2013/0113323 A1* | 5/2013 | Yamada | ............... | H02K 1/2706 |
| | | | | 310/156.07 |
| 2014/0070655 A1* | 3/2014 | Schneider | .............. | H02K 1/272 |
| | | | | 310/156.49 |
| 2015/0288233 A1* | 10/2015 | Kim | ..................... | H02K 1/2766 |
| | | | | 310/156.43 |

FOREIGN PATENT DOCUMENTS

| | | | |
|---|---|---|---|
| DE | 102012010993 | A1 | 12/2013 |
| FR | 2568067 | A1 | 1/1986 |

\* cited by examiner

ROTOR FOR AN ELECTRIC MOTOR, ELECTRIC MOTOR, DRIVE FOR A VEHICLE, AND HYBRID OR ELECTRIC VEHICLE

CROSS-REFERENCE TO RELATED APPLICATION

This application claims the priority, under 35 U.S.C. § 119, of German patent application DE 10 2016 207 800.3, filed May 4, 2016; the prior application is herewith incorporated by reference in its entirety.

BACKGROUND OF THE INVENTION

Field of the Invention

The invention relates to a rotor for an electric motor. The invention additionally relates to an electric motor. Furthermore, the invention relates to a device for driving a vehicle, and to a vehicle.

Rotors for electric motors are disclosed in patent application publication No. US 2010/0171386 A1 (see, German published DE 11 2008 001 333 T5) and in commonly assigned German published patent application DE 10 2012 010 993 A1. Those rotors have a plurality of embedded permanent magnets, of which, when viewed in an end-face view of the rotor, at least two permanent magnets are each oriented in such a way that one end is radially closer to a circumference of the rotor than an opposite end. The foregoing publications are herewith incorporated by reference.

Such rotors are a constituent part of motors having internally mounted permanent magnets. These motors can deliver a comparatively high torque, or a comparatively high efficiency, and are therefore used in preference, for example as drive motors, for hybrid vehicles and electric vehicles, in which a high drive power must be output. A magnetic stator field generated in the stator of the motor acts, as an inverse magnetic field (opposing field), on these permanent magnets. If such an opposing field is too great, this can result in an irreversible demagnetization of the magnets, and consequently in a failure of the motor.

Hitherto, it has been sought to set a high coercive field strength of the permanent magnets against the generated opposing field. This is achieved by alloying the permanent magnets with rare-earth elements such as, for example, dysprosium (Dy) and/or neodymium (Nd) and/or terbium (Tb). The temperature resistance of the permanent magnets is also thereby increased. However, such rare-earth elements are very expensive.

In order to reduce costs, it is proposed in US 2010/0171386 A1 to divide the permanent magnets into a plurality of magnetic regions that have differing coercive field strengths. In this case, the region having the greatest coercive field strength, i.e. having the highest proportion of rare earths, is positioned such that it is exposed to the greatest opposing field load. In the case of the regions having a lesser opposing field load, the proportion of rare earths is reduced accordingly. In this way, the expensive rare earth elements are thus only used to a greater extent where they are actually needed.

According to the above-mentioned DE 10 2012 010 993 A1, a further cost reduction is to be achieved in that, when viewed in an end-face view of the rotor, the end of the permanent magnets that is radially closer to the circumference of the rotor is wider than the opposite end of the permanent magnets.

In the case of the prior art arrangements, the opposing field always permeates the permanent magnets in the rotor, such that there continues to be the possibility of demagnetization of the permanent magnets.

SUMMARY OF THE INVENTION

It is accordingly an object of the invention to provide a rotor for an electric motor which overcomes the above-mentioned and other disadvantages of the heretofore-known devices and methods of this general type and which further decreases the possibility of demagnetization of the permanent magnets in a rotor of an electric motor.

With the foregoing and other objects in view there is provided, in accordance with the invention, a rotor for an electric motor, the rotor comprising:

a magnetically conductive rotor core and at least one permanent magnet embedded in the rotor core, the rotor core having at least one flux path defined therein for conducting a magnetic flux caused by a magnetic stator field generated by a stator of the electric motor;

at least one magnetically conductive shunt formed in the rotor core for the at least one flux path, the at least one magnetically conductive shunt bridging the at least one permanent magnet for the magnetic flux caused by the stator field.

In other words, the objects of the invention are achieved by a rotor for an electric motor, comprising at least one permanent magnet embedded in a magnetically conductive rotor core, and at least one flux path, realized in the rotor core, for a magnetic flux caused by a magnetic stator field generated by a stator of the electric motor, wherein the rotor core is realized, with respect to at least one of the at least one flux paths, with at least one magnetically conductive shunt that bridges at least one of the at least one permanent magnets for the magnetic flux that is caused by the stator field.

According to the invention, in this way the permanent magnet, or the permanent magnets, of the rotor of the electric motor are disposed outside of the flux paths provided in the rotor core for the magnetic flux that is caused in the rotor core by the magnetic field caused by the stator, i.e. the stator field. A permanent magnet embedded in the rotor core in the case forms, within the rotor core, a region of low magnetic conductivity, around which the magnetic flux resulting from the stator field is guided by one or more magnetically conductive shunts, i.e. the permanent magnet is bridged by the magnetically conductive shunt or shunts for the magnetic flux caused by the stator. Consequently, the stator field cannot act, as an opposing field, such that it has a demagnetizing effect on the permanent magnet or permanent magnets. The latter can therefore be realized with a lesser coercive field strength than would be required to prevent demagnetization of the permanent magnet or permanent magnets if the latter were to become permeated by the opposing field.

Advantageously, the at least one magnetically conductive shunt simultaneously forms a magnetic conductor for the magnetic flux of the permanent magnet; in particular, the at least one magnetically conductive shunt is directly adjacent to at least one magnetic pole—magnetic north pole and/or south pole—of the permanent magnet.

The invention thus makes it possible to use permanent magnets having a further reduced proportion of rare earths, corresponding to the reduction of the required coercive field strength. In a marginal case it is even possible to dispense entirely with the addition of rare-earth elements in the material of the permanent magnets; it is thereby possible to achieve a further reduction in cost for the production of the permanent magnets.

In accordance with an added feature of the invention, a direction of magnetization of at least one of the at least one permanent magnets is oriented substantially (i.e., either exactly or at least almost) orthogonally to the direction of the magnetic flux, caused by the stator field, in at least one flux path adjacent to the at least one of the at least one permanent magnets, in particular in at least one shunt of this flux path. In other words, the direction of the magnetic flux caused by the stator field, for which the said flux path is realized, is at least substantially orthogonal to the direction of magnetization of the respective permanent magnet. Consequently, the stator field does not act as an opposing filed for the permanent magnet, and demagnetization is prevented in an effective manner.

It should be noted at this point that a motor having a stator and a rotor is known from U.S. Pat. No. 9,273,691 B2 and its counterpart German published patent application DE 10 2012 021 109 A1 (these publications are herewith incorporated by reference). That stator comprises an armature core having a plurality of teeth that extend radially inward, and a segment conductor wire that is wound around each tooth of the armature core. The rotor comprises first and second rotor cores, a ring magnet as a field magnet, and a connecting magnet as an integrated auxiliary magnet.

The first rotor core comprises a disk-type first core base, and a plurality of first hook-type magnet poles, which are disposed at equal distances on a peripheral portion of the first core base. In this case, each of the first hook-type magnet poles projects outward in the radial direction of the rotor, and comprises a first elongated portion, which extends along an axial direction of the rotor. The second rotor core comprises a disk-type second core base, and a plurality of second hook-shaped magnet poles, which are disposed at equal distances on a peripheral portion of the second core base. In this case, each of the second hook-type magnet poles projects outward in the radial direction, and comprises a second elongated portion, which extends along the axial direction. The first and second hook-type magnet poles are disposed alternately along a circumferential direction of the rotor in a state in which the first and the second core base are mutually opposite in the axial direction.

The field magnet is disposed between the first and the second core base in the axial direction, and is magnetized along the axial direction such that the first hook-type poles act first poles—here: north poles—and the second hook-type poles act as second poles—here: south poles. A neodymium magnet may be used as a field magnet.

The auxiliary magnet comprises at least two or more inter-pole magnet portions, which are realized so as to be integral with connecting portions, wherein each of the inter-pole magnet portions is disposed in a cavity between respectively one of the first hook-type poles and respectively one of the second hook-type poles, and is magnetized in the circumferential direction. It is explicitly described that the auxiliary magnet is realized from first and second inter-pole magnet portions, which are disposed between the first hook-type poles and the second hook-type poles, and connecting portions, which connect axial end portions of these inter-pole magnet portions. The connecting portions are disposed alternately at the first end side and at the other end side of the rotor, in each cavity between the hook-type poles. In this case, a zigzag shape is produced along the hook-type poles by the inter-pole magnet portions and the connecting portions. The first and the second inter-pole magnet portions are magnetized in the circumferential direction in such a manner that parts thereof, which face toward the first and second hook-type poles, have the same polarities.

In the case of this configuration, the directions of the magnetizations, both of the field magnets and of the auxiliary magnet, are oriented orthogonally to the direction of a magnetic field, generated by the stator, coming out of the teeth of the armature core. However, no measures are described to avoid the situation in which the magnetic field generated by the stator, as an opposing field, permeates the magnets—the field magnet and also the auxiliary magnet—and thereby causes demagnetization, both of the field magnet and of the auxiliary magnet.

In the case of a further preferred embodiment of the rotor according to the invention, a plurality of permanent magnets and a plurality of magnetically conductive shunts are provided, wherein at least some of the permanent magnets and at least some of the magnetically conductive shunts are arranged in a grouped combination to form respectively one permanent magnet group.

Advantageously in this case, each permanent magnet group, respectively, is realized in such a manner and in order to be used like a single permanent magnet in a conventional rotor, e.g. instead of the permanent magnets having the reference Mb in FIG. 10(a) of the above-mentioned publication US 2010/0171386 A1, or the permanent magnets having the references Mc1, Mc2 and Mc3 in FIG. 11(a) of the publication. Although the individual permanent magnet groups, of which, in this example, respectively one is used to replace respectively one of the permanent magnets Mb, Mc1, Mc2 and Mc3, are thus disposed entirely in the rotor flux paths there for the magnetic flux caused by the stator, owing to the design according to the invention the individual permanent magnets of the permanent magnet groups are nevertheless not permeated by this flux; instead, this flux is routed through the at least one shunt of each permanent magnet group. Advantageously in this case, the permanent magnet groups, with the configuration of the rotor core being otherwise unchanged—apart from the structure of the rotor core in the area immediately surrounding the permanent magnets—can replace the conventional permanent magnets in the conventional arrangements that are permeated by the stator field, whereby advantages of these arrangements, i.e. rotor configurations, can be assumed directly. Within the individual permanent magnet groups, the magnetically conductive shunts for the magnetic flux caused in the rotor core by the stator preferably simultaneously form magnetic conductors for the magnetic flux of the permanent magnets of the respective permanent magnet group.

According to a further preferred embodiment of the rotor according to the invention, the permanent magnets arranged in combination to form respectively one permanent magnet group are ranged almost rectilinearly in succession, wherein, in particular, the permanent magnets within this row have a direction of magnetization that in each case is reversed from one of the permanent magnets to the next, preferably a direction of magnetization that in each case is reversed by at least almost 180°. This ranging in a rectilinear row favors the creation of an oblong-rectangle cross-sectional structure of the permanent magnet group—in particular as viewed in a cross section through the rotor core in a radially oriented cross-sectional plane—and consequently simple replacement of conventional permanent magnets by a permanent magnet group according to the invention in the realization of the rotor core.

In a further preferred design of the rotor according to the invention, permanent magnets, in particular respectively one of the permanent magnets, and magnetically conductive shunts, in particular respectively one of the magnetically conductive shunts, are disposed alternately in respectively one of the permanent magnet groups; preferably, the permanent magnets and magnetically conductive shunts are disposed alternately in succession along the at least almost rectilinear row. There is thus provided, for each of the permanent magnets, on each of the two sides in the direction of the row, a respective shunt, via which, on the one hand, the flux from the stator is routed; on the other hand, the two shunts adjacent to respectively one of the permanent magnets route the flux of the permanent magnet. This produces a particularly advantageous configuration for the aforementioned intended purpose.

In accordance with an additional feature of the invention, at least one recess is formed in the rotor core, forming a magnet pocket for accommodating the at least one embedded permanent magnet, preferably respectively one of the at least one magnet pockets for respectively one of the at least one permanent magnets, wherein each of the at least one magnet pockets is realized with respectively at least one magnetically non-conductive spatial region that, with respect to a direction of magnetization of the at least one permanent magnet when this at least one permanent magnet is in a proper mounting position in the at least one magnet pocket, is disposed at the side of this permanent magnet.

In particular, walls of the individual magnet pockets are closely adjacent to magnet poles of the permanent magnets accommodated therein, so as to ensure good conduction of the magnetic flux of the permanent magnets into the rotor core. The walls of the magnet pockets in this case are formed by the magnetically conductive shunts, and are preferably integral with the rotor core. At the same time, the magnetically non-conductive spatial regions disposed, at least one per permanent magnet, at the side of the individual permanent magnets—realizing a type of magnetically non-conductive "protective spaces" at the side of the permanent magnets—on the one hand prevent the permanent magnet from being permeated, transversely through the permanent magnets, i.e. orthogonally in relation to the direction of magnetization of the permanent magnets, by the flux generated by the stator. On the other hand, these magnetically non-conductive spatial regions serve to avoid magnetic short circuits for the flux of the permanent magnets.

According to a preferred development of the rotor according to the invention, at least one of the at least one magnet pockets is realized with, in particular, hook-type shapes for guiding and/or holding the at least one permanent magnet in the magnet pocket and for mechanical support and/or load relief in the rotor core via the at least one permanent magnet. In particular, these hook-type shapes are formed onto the magnetically conductive shunts and project into the magnetically non-conductive spatial regions. This achieves the effect that the hook-type shapes prevent the permanent magnets from slipping into the magnetically non-conductive spatial regions, such that the magnetically non-conductive spatial regions can be realized as recesses filled with gas and/or fluid and/or, preferably, air, thereby saving costs and weight. Advantageously, the hook-type shapes encompass the individual permanent magnets and support them in the radial direction of the rotor, or in a direction in which force components of centrifugal forces act on them when the rotor is in operation. As a result, not only are the permanent magnets protected against the influence of the centrifugal forces in the rotor core, but it also becomes possible to relieve the load of the centrifugal forces in the rotor core via the shunts and the permanent magnets; in particular, portions of the rotor core that are disposed radially outside of a mounting position of a permanent magnet and/or of a permanent magnet group are supported, via the shunts and the permanent magnets, against the action of the centrifugal forces. This increases the mechanical strength of the rotor.

There is also provided, in accordance with the invention, an electric motor, which includes a rotor as described and claimed.

The objects of the invention are also achieved by a means for driving a vehicle, in particular a road vehicle, which comprises an electric motor of the type previously described and/or a rotor as described and claimed.

Finally, there is also provided, in accordance with the invention, a vehicle, in particular a road vehicle, which comprises a traction device as described, in the form of an electric motor with the above-summarized rotor.

The corresponding electric motor lends itself to inexpensive production, particularly in large-scale motor-vehicle production, with a high output being achievable at the same time.

Other features which are considered as characteristic for the invention are set forth in the appended claims.

Although the invention is illustrated and described herein as embodied in a rotor for an electric motor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
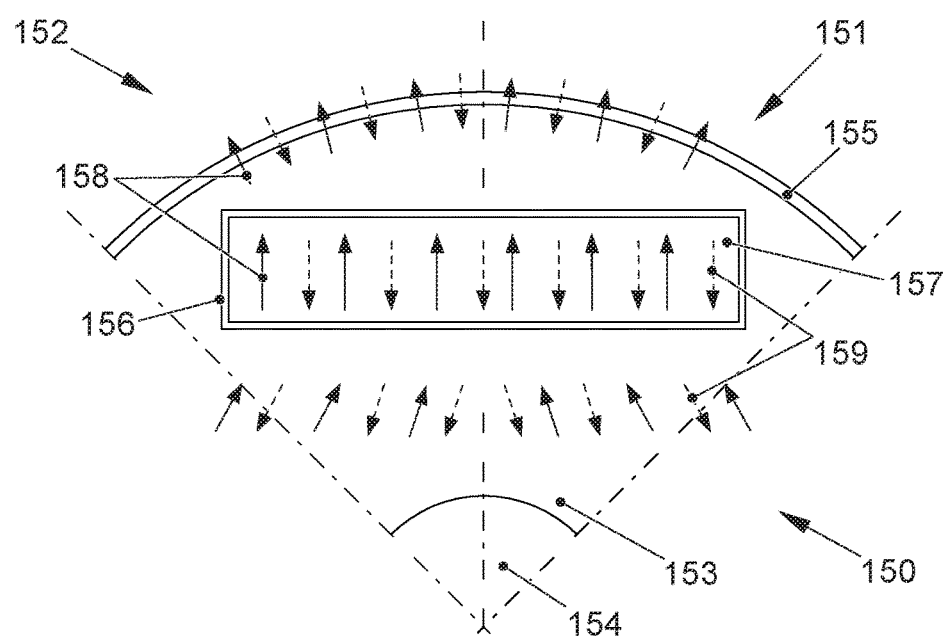
FIG. 1 shows, in a roughly schematic representation, a sector-shaped portion of an axial sectional view of a first example for a conventional electric motor having a conventional prior art permanent magnet.

Referring now to the figures of the drawing in detail and first, particularly, to FIG. 1 thereof, there is shown, identified by reference numeral 152, a conventional electric motor, such as a motor as shown in similar form in US 2010/0171386 A1 (cf. FIGS. 8F, 10(a) and, in particular, 14(a)), with a number of poles that is varied according to the principle. The electric motor 152 is represented, in roughly schematic form, in a sectional view along a radial plane, only a portion corresponding to one quarter of the total cross section being shown, for simplification. The electric motor 152 comprises a stator 151 and a rotor 150, having a magnetically conductive rotor core 153 and a magnetically non-conductive rotor shaft 154. An air gap 155 extends between the stator 151 and the rotor 150, in the circumferential direction of a rotor core 153, along the circumferential surface thereof, and into the plane of the drawing.

A recess is formed in the rotor core 153, extending in the axial direction of the rotor 150, i.e. perpendicularly into the plane of the drawing. The recess has a rectangular cross section and, with a greater of its two cross-sectional dimensions, extends tangentially, i.e. in the circumferential direction, in relation to the rotor 150. The recess forms a magnet pocket 156 and accommodates a cuboid permanent magnet 157, which, in this simplified representation, completely fills the magnet pocket 156. To this extent, the spatial arrangement of the permanent magnet 157 in the rotor core 153 of the electric motor 152 according to FIG. 1 corresponds to that of the magnet Mf in FIG. 14(a) of US 2010/0171386 A1.

In FIG. 1, the magnetic flux, or the magnetic field, caused by a magnetization of the permanent magnet 157 is indicated, in direction and spatial propagation in the permanent magnet 157, in the rotor core 153 and in the stator 151, by arrows 158. In the case of the illustrated arrangement, this magnetic flux, or this magnetic field 158, caused by the permanent magnet 157 is directed away from the center of the rotor, i.e. away from a rotor shaft 154, through the permanent magnet 157 and the rotor core 153, via the air gap 155, into the stator 151.

By contrast, the magnetic flux, or the magnetic field, caused by the stator 151 is indicated, in direction and spatial propagation in the permanent magnet 157, in the rotor core 153 and in the stator 151, by arrows 159. In the case of the illustrated arrangement, this magnetic flux, or this magnetic field 159, caused by the stator 151 is directed from the stator 151, via the air gap 155, into the rotor core 153, and through the permanent magnet 157 to the center of the rotor, i.e. to the rotor shaft 154.

Thus, within the permanent magnet 157, the magnetic fields, or magnetic fluxes, from the stator 151 and from the permanent magnet 157 are oriented counter to each other, i.e. the magnetic field 159 from the stator 151, the stator field, forms an opposing field to the magnetic field 158 of the permanent magnet 157. The opposing field can cause the permanent magnet 157 to become demagnetized if the magnetic field strength of the stator field is of a corresponding magnitude.

Figure 2:
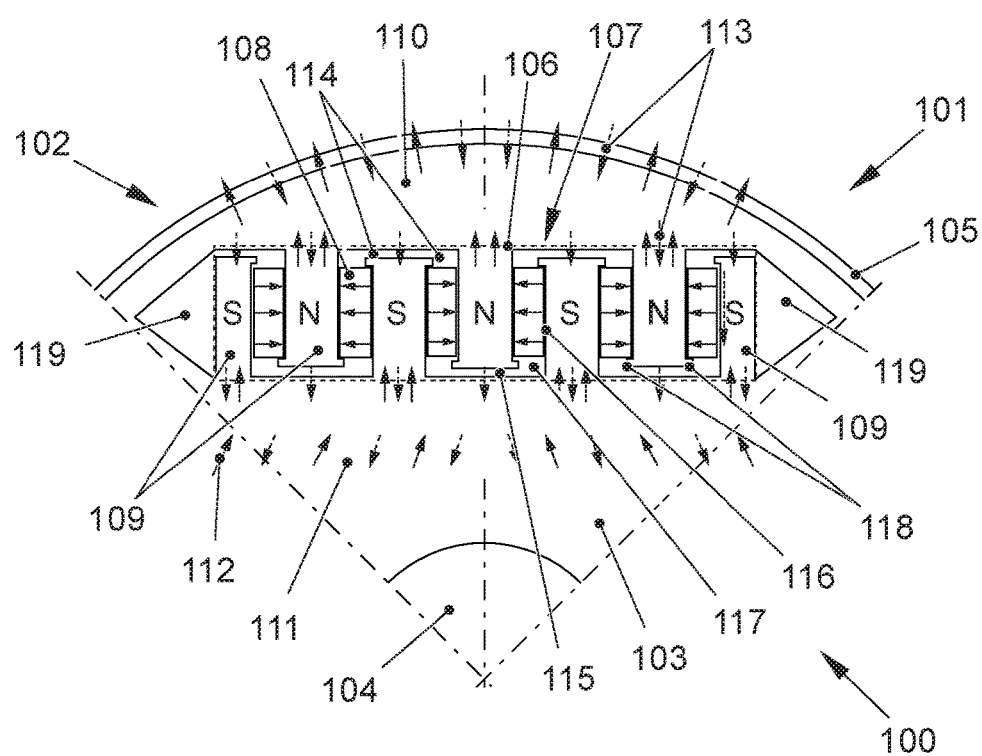
FIG. 2 shows, in a roughly schematic representation, an electric motor according to the invention having a first exemplary embodiment of a rotor according to the invention, as a modification according to the invention of the electric motor according to FIG. 1, likewise represented in a sector-shaped portion of an axial sectional view.

FIG. 2 shows a first exemplary embodiment of an electric motor 102 according to the invention, with a first exemplary embodiment of a rotor 100 according to the invention as a modification according to the invention of the electric motor 152 which is illustrated in FIG. 1. Here, too, the assembly is illustrated in a highly schematic representation, in a sector-shaped portion of an axial sectional view. A stator 101 of the electric motor 102 is preferably identical in structure to the stator 151 of the electric motor 152 according to FIG. 1 and it is also not illustrated in greater detail. The rotor 100 of the electric motor 102 is realized with a magnetically conductive rotor core 103 and a magnetically non-conductive rotor shaft 104. An air gap 105 extends between the stator 101 and the rotor 100, in the circumferential direction of the rotor core 103, along the circumferential surface thereof and into the plane of the drawing.

A recess 114 is formed in the rotor core 103, extending in the axial direction of the rotor 100, i.e. perpendicularly into the plane of the drawing. The recess 114 has a contour according to the invention. For this, within a region 106 of the sector-shaped portion of the axial sectional view of the rotor core 103 there is now disposed a permanent magnet group 107, having a rectangular cross section, which is preferably at least almost the same as the cross section of the magnet pocket 156 according to FIG. 1, or which resembles the latter, and which, with a larger of its two cross-sectional dimensions, again extends tangentially, i.e. in the circumferential direction, in relation to the rotor 100, extending in this tangential direction.

The permanent magnet group 107 is realized with a linear row of permanent magnets 108 and magnetically conductive shunts 109 that is oriented in the direction of the greater of its two cross-sectional dimensions, i.e. in the tangential direction of the rotor 100, respectively one of the permanent magnets 108 and respectively one of the magnetically conductive shunts 109 being disposed in mutual alternation in the direction of this row, beginning and ending with respectively one of the magnetically conductive shunts 109. Each of the permanent magnets 108 is thus bordered on both sides, in the direction of the row, by respectively one of the magnetically conductive shunts 109. In addition, the magnetizations of the permanent magnets 108 are oriented along the aforementioned tangential direction of the rotor 100, i.e. in the direction of the said row, but rotated by 180° from respectively one of the permanent magnets 108 in the row to the next, such that, alternately along the row, respectively two magnetic north poles N and two magnetic south poles S face toward each other via respectively one of the magnetically conductive shunts 109, and are connected in a magnetically conductive manner. In a modification, the permanent magnet group 107 may comprise magnets of differing sizes, or also a different number of magnets, e.g. also only two magnets. Also, the magnets may be positioned radially further inward or outward.

The magnetically conductive shunts 109 between every two mutually facing magnetic north poles N of two permanent magnets 108 that succeed one another in the row then respectively form a common magnetic north pole of these two permanent magnets 108, and in the example according to FIG. 2 are respectively connected to, in particular integrally formed onto, a portion 110 of the rotor core 103 that faces radially outward, i.e. toward the air gap 105, such that the magnetic field is directed from these common north poles N toward the air gap 105, and thus toward the stator 101.

The magnetically conductive shunts 109 between every two mutually facing magnetic south poles S of two permanent magnets 108 that succeed one another in the row respectively form, correspondingly, a common magnetic south pole of these two permanent magnets 108, and in the example according to FIG. 2 are respectively connected to, in particular integrally formed onto, a portion 111 of the rotor core 103 that faces radially inward, i.e. toward the rotor shaft 104, such that the magnetic field of the permanent magnets 108 leads from the direction of the rotor shaft 104 to these common south poles S.

The spatial course of the magnetic field, or magnetic flux, caused by the permanent magnets 108 is symbolized by arrows 112.

The stator 101, on the other hand, causes a magnetic field—stator field—or a magnetic field, that in FIG. 2 is symbolized by arrows 113. This magnetic field 113 forms a magnetic field that is directed contrary to the magnetic field, in the stator 101, air gap 105 and rotor 100, that is caused by the permanent magnets 108, i.e. an opposing field. The opposing field 113 goes from the radially outwardly facing portion 110 of the rotor core 103, i.e. toward the air gap 105, via the magnetically conductive shunts 109, to the radially inwardly facing portion 111 of the rotor core 103, i.e. toward the rotor shaft 104, without going through the permanent magnets 108, i.e. it goes through the magnetically conductive shunts 109, around the permanent magnets 108. An influence of the opposing field 113 upon the permanent magnets 108 is thereby prevented, or at least reduced to such an extent that demagnetization of the permanent magnets 108 is thereby prevented.

The recess 114 extending in the rotor core 103, in the axial direction of the rotor 100, i.e. perpendicularly into the plane of the drawing, extends along the radial cross-sectional plane in the rotor core 103 in a zigzag shape within the region 106 that has a rectangular cross section, and in so doing forms, firstly, air gaps 115 at end faces of the magnetically conductive shunts 109 of the permanent magnet group 107 that are oriented substantially radially, i.e. in a direction orthogonal to the tangential direction of the rotor 100, secondly, magnet pockets 116 for accommodating the permanent magnets 108 of the permanent magnet group 107, here, advantageously, respectively one magnet pocket 116 for respectively one permanent magnet 108, and, thirdly, for each magnet pocket 116 respectively two magnetically non-conductive spatial regions 117, which, with respect to the direction of magnetization of the permanent magnets 108 in their proper mounting position in the magnet pocket 116, are disposed on both sides of this permanent magnet 108 and serve to guide flux at the side of the permanent magnets 108. Following the zigzag-type extent of the recess 114, succeeding one another in this sequence are an air gap 115, a magnetically non-conductive spatial region 117, a magnet pocket 116, a magnetically non-conductive spatial region 117, an air gap 115, a magnetically non-conductive spatial region 117, a magnet pocket 116, a magnetically non-conductive spatial region 117, an air gap 115, etc., ending with an air gap 115. The walls of the magnet pockets 116 in this case are formed by the magnetically conductive shunts 109. The magnetically non-conductive spatial regions 117 cause both the stator field and the magnetic field of the permanent magnets 108, or the associated magnetic fluxes, to be guided at a distance from the sides of the permanent magnets 108.

The magnet pockets 116 are bounded against the magnetically non-conductive spatial regions by hook-type shapes 118, which are formed on, preferably integrally formed onto, the end faces of the magnetically conductive shunts 109, bound these end faces on both sides in the tangential direction of the rotor 100, and serve to guide and/or hold the permanent magnets 108 accommodated in the magnet pockets 116. For this purpose, each of the permanent magnets 108 is accommodated between respectively two of the hook-type shapes 118 of each two adjacent, oppositely directed magnetically conductive shunts 109, one of these magnetically conductive shunts 109 being connected to the radially outwardly facing portion 110 of the rotor core 103, i.e. toward the air gap 105, and the other of these magnetically conductive shunts 109 being connected to the radially inwardly facing portion 111 of the rotor core 103, i.e. toward the rotor shaft 104. In this way, not only are the permanent magnets 108 held in the magnet pockets 116 by form closure and force closure, but the radially outwardly facing portion 110 of the rotor core 103, i.e. toward the air gap 105, is also mechanically supported, in particular against centrifugal forces during operation, via the permanent magnets 108, on the radially inwardly facing portion 111 of the rotor core 103, i.e. toward the rotor shaft, and the mechanical strength of the rotor 100 is thus increased.

Adjoining the recess 114 at both of its ends—as viewed in the tangential direction of the rotor 100—at narrow ends of the region 106, and thus adjoining the permanent magnet group 107, there are lateral, triangular air spaces 119, extending in the axial direction of the rotor 100, each one of which is respectively connected to one of the air gaps 115 in which the recess 114 terminates. These lateral, triangular air spaces 119 deflect and bundle the stator field through, or onto, the permanent magnet group 107. A mechanical weakening of the rotor core 103 caused by these lateral, triangular air spaces 119 is compensated by the load relief via the permanent magnets and the shunts 109. In addition, these lateral, triangular air spaces 119 deflect, or bundle, the magnetic field of the permanent magnets 108 of the permanent magnet group 107, in particular of the first and the last of the permanent magnets 108 in the linear row of permanent magnets 108 of the permanent magnet group 107, and form, or bound, the first and the last of the shunts 109 of the permanent magnet group 107. In a modification, the air spaces 119 may also have different contours, e.g. that of a semicircle.

Figure 3:
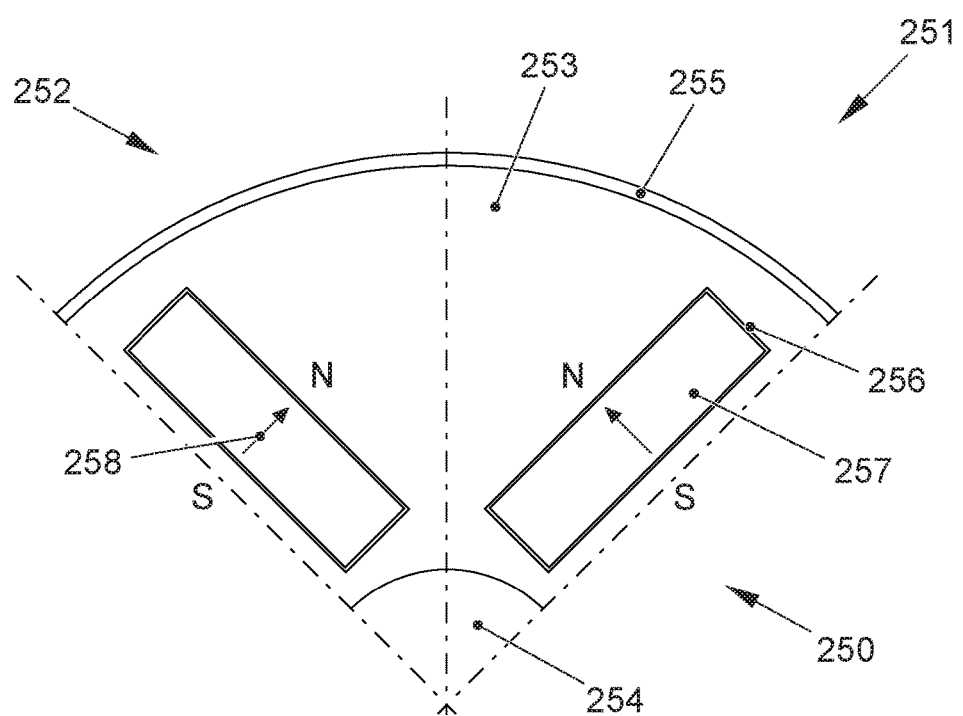
FIG. 3 shows, in a roughly schematic representation, a sector-shaped portion of an axial sectional view of a second example for a conventional electric motor having two conventional permanent magnets in a so-called V arrangement.

FIG. 3 shows, in a roughly schematic representation, a sector-shaped portion—here, in the form of one quarter of a circle—of an axial sectional view of a second example for a conventional electric motor 252 having two conventional permanent magnets 257 in a so-called V arrangement. The conventional electric motor 252 comprises a stator 251, and a rotor 250, which is realized with a magnetically conductive rotor core 253 and a magnetically non-conductive rotor shaft 254. An air gap 255 extends between the rotor 250 and the stator 251. The permanent magnets 257 are accommodated in magnet pockets 256, which are formed in the rotor core 253. Apart from the arrangement and number of the permanent magnets 257 and magnet pockets 256, the structure of the electric motor 252 corresponds to that of the electric motor 152 according to FIG. 1, and thus largely to that of DE 11 2008 001 333 T5, in particular FIGS. 2 therein—permanent magnets therein having the references 21—, 8A, 8E, 9(a)—permanent magnets Ma1, Ma2 therein—and 13(a)—permanent magnets Me1, Me2 therein—with associated description of known design. In this case, the permanent magnets in a V arrangement may enclose differing angles. Also represented schematically in FIG. 3, by arrows 258, is a direction of magnetization of the permanent magnets 257 in their mounting position in the rotor core 253, and the magnetic north poles N are denoted by N, the magnetic south poles being denoted by S.

Figure 4:
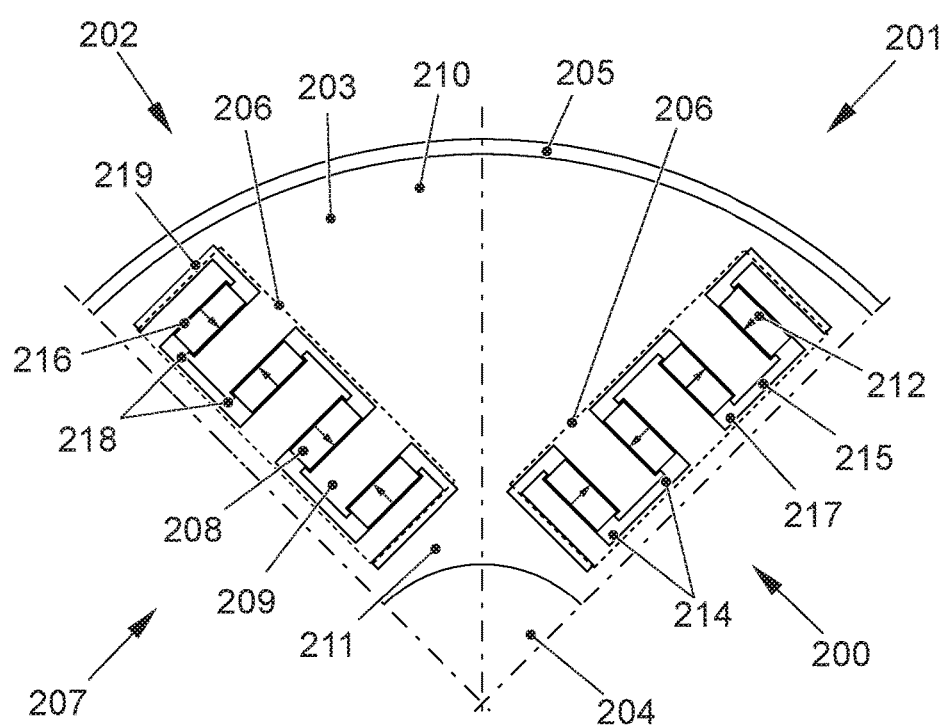
FIG. 4 shows, in a roughly schematic representation, an electric motor according to the invention having a second exemplary embodiment of a rotor according to the invention, as a modification according to the invention of the electric motor according to FIG. 3, likewise represented in a sector-shaped portion of an axial sectional view.

Represented in FIG. 4, as a modification according to the invention of the conventional electric motor 252 from FIG. 3, is a second exemplary embodiment of an electric motor according to the invention, denoted by the reference 202, with a second exemplary embodiment of a rotor 200 according to the invention and a stator 201, represented in the same view as that according to FIG. 3. As compared with FIG. 3, in FIG. 4 the conventional magnet pockets 256 and permanent magnets 257, in regions 206, of rectangular cross section, preferably corresponding to the dimensions and extents, or positions, of these magnet pockets 256 and permanent magnets 257, have been replaced by permanent magnet groups 207, which correspond in their structure to that of the permanent magnet group 107 according to FIG. 2, except for the fact that, here, on the one hand, four instead of six permanent magnets 208 are provided, alternately with magnetically conductive shunts 209, in a linear row, and that, on the other hand, a recess 214 in the rotor core 203, which extends in the axial direction of the rotor 200, i.e. perpendicularly into the plane of the drawing, and which accommodates the permanent magnet group 207, or the permanent magnets 208, now goes into lateral, rectangular air spaces 219, which adjoin the recess 214 on both sides, at narrow ends of the region 206. Optionally, a different number of permanent magnets 208 may also be provided here, e.g. six permanent magnets 208.

As in FIG. 2, the magnetically conductive shunts 209 are realized to hold the permanent magnets 208 with hook-type shapes 218, and the recess 214, in a manner resembling that of the recess 114 according to FIG. 2, comprises air gaps 215, alternately along a zigzag-type extent, at end faces of the magnetically conductive shunts 209 in the permanent magnet group 207, these end faces here, owing to the angle of the V arrangement of the permanent magnet groups 207, facing substantially in the circumferential direction of the rotor 200, magnet pockets for accommodating the permanent magnets 208, and magnetically non-conductive spatial regions 217 for the magnet pockets 216, which are disposed laterally with respect to a direction of magnetization 212 of the permanent magnets 208. The magnetic field courses in the rotor 200 are not represented in detail.

In the case of the rotor 200 also, a radially outwardly facing portion 210 of the rotor core 203, i.e. toward the air gap 205, is supported against a radially inwardly facing portion 211 of the rotor core 203, i.e. toward the rotor shaft 204, via the hook-type shapes 218 and the permanent magnets 208, and the stability of the rotor 200 against centrifugal forces is thus increased.

Figure 5:
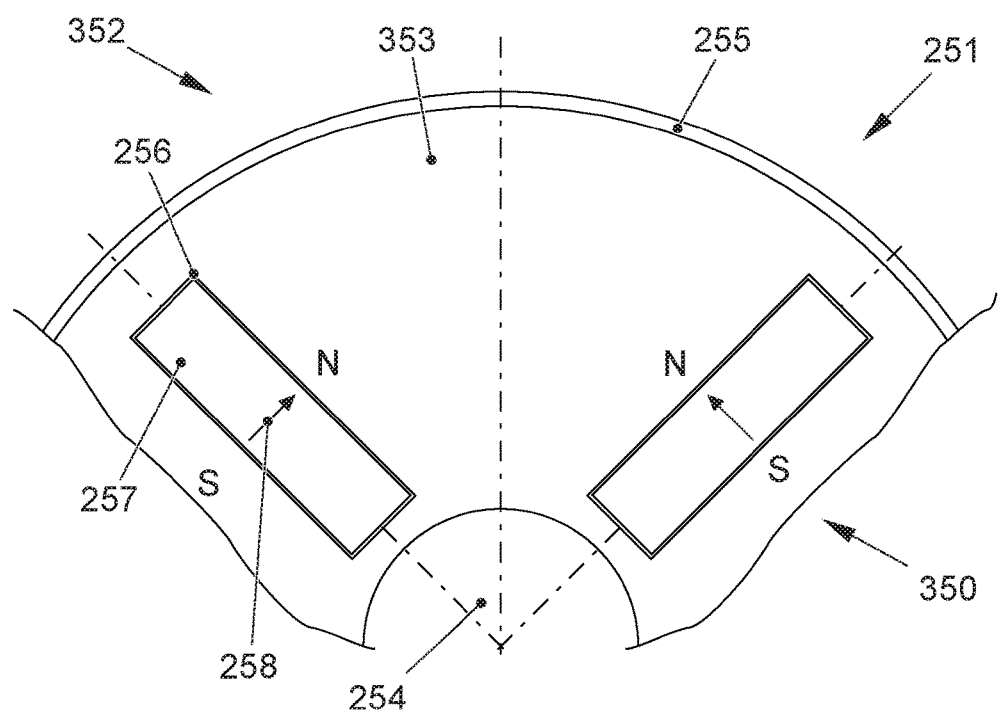
FIG. 5 shows, in a roughly schematic representation, a sector-shaped portion of an axial sectional view of a third example for a conventional electric motor having two conventional permanent magnets in a so-called Q arrangement.

FIG. 5 shows, in roughly schematic form, a sector-shaped portion of an axial sectional view of a third example for a conventional electric motor 352 having two conventional permanent magnets in a so-called Q arrangement. Unlike the V arrangement according to FIG. 3, in the case of the Q arrangement axes that intersect the magnet pockets centrally have been shifted into the center of the rotor shaft, which corresponds to the rotor shaft 254 according to FIG. 3. Apart from the position of the magnet pockets, which otherwise correspond to the magnet pockets 256 according to FIG. 3, in the rotor core 353, thereby slightly modified in comparison with the electric motor 252 according to FIG. 3, and thus also modified rotor 350, the electric motor 352 is structurally the same as the electric motor 252 according to FIG. 3.

Figure 6:
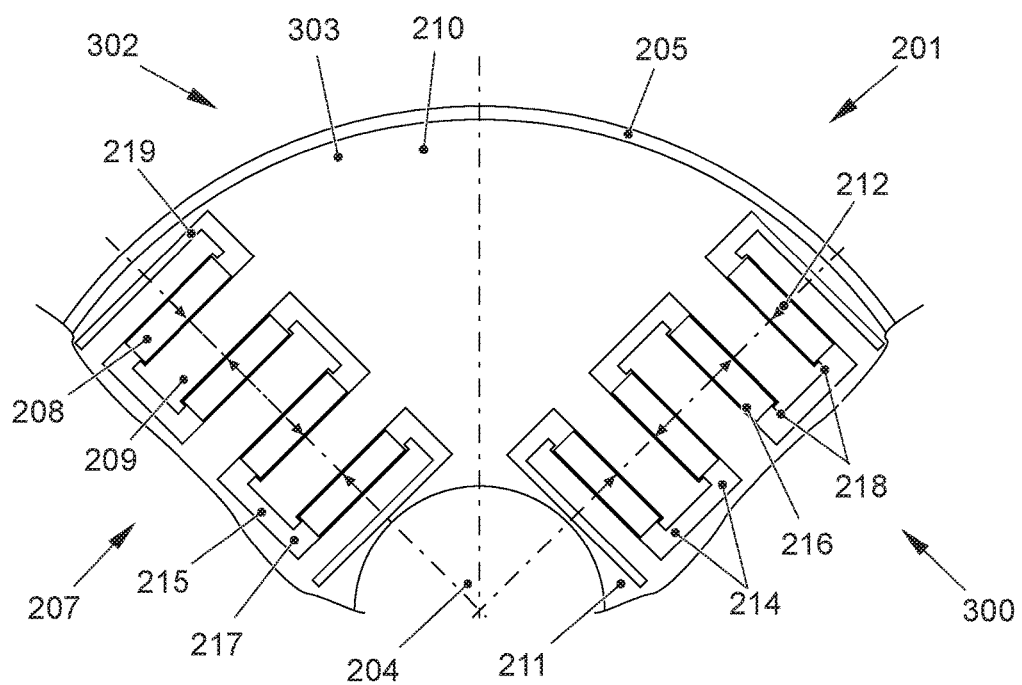
FIG. 6 shows, in a roughly schematic representation, a third exemplary embodiment of an electric motor according to the invention having a third exemplary embodiment of a rotor according to the invention, as a modification according to the invention of the electric motor according to FIG. 5, likewise represented in a sector-shaped portion of an axial sectional view.

FIG. 6 shows a third exemplary embodiment of an electric motor 302 according to the invention, with a third exemplary embodiment of a rotor 300 according to the invention as a modification according to the invention of the electric motor 352 according to FIG. 5, in a representation corresponding to the preceding figures. In accordance with the extensive correspondence of the electric motors 252 and 352, the electric motor 302 also differs from the electric motor 202 only in the position of the permanent magnet groups 207, otherwise taken without change from FIG. 4, in the rotor core, now denoted by 303, of the rotor 300 of the electric motor 302, such that the same features and advantages are applicable to the electric motor 302 as for the electric motor 202 according to FIG. 4.

The following is a summary list of reference numerals and the corresponding structure used in the above description of the invention:

100 rotor of 102
101 stator of 102
102 electric motor (FIG. 2)
103 rotor core of 100
104 rotor shaft of 100
105 air gap between 100 and 101
106 region in 103 of 100 having rectangular cross section, in which 107 extends
107 permanent magnet group in 103 of 100
108 permanent magnet of 107
109 magnetically conductive shunt of 107
110 portion of 103 facing radially outward, i.e. toward 105
111 portion of 103 facing radially inward, i.e. toward 104
112 arrows: spatial course of the magnetic field (flux), caused by 108
113 arrows: magnetic field—stator field—or magnetic flux/opposing field caused by 101
114 recess in 103 extending in axial direction of 100, i.e. perpendicularly into the plane of the drawing, accommodates 107 and 108
115 air gap at end faces of 109 in 107 that are oriented substantially radially, i.e. in a direction orthogonal to the tangential direction of 100
116 magnet pocket for accommodating 108
117 magnetically non-conductive spatial regions for 116, which is disposed laterally with respect to the direction of magnetization of 108
118 hook-type shape on 109
119 lateral, triangular air space adjoining 114
150 rotor of 152
151 stator of 152
152 electric motor (FIG. 1)
153 rotor core of 150
154 rotor shaft of 150
155 air gap between 150 and 151
156 magnet pocket in 153 for 157
157 permanent magnet in 156
158 arrows: magnetic flux (magnetic field) caused by magnetization of 157
159 arrows: magnetic flux, or magnetic field, caused by 151—stator field
200 rotor of 202
201 stator of 202
202 electric motor (FIG. 4)
203 rotor core of 200
204 rotor shaft of 200
205 air gap between 200 and 201
206 region in 203 of 200 having rectangular cross section, in which 207 extends
207 permanent magnet group in 203 of 200
208 permanent magnet of 207
209 magnetically conductive shunt of 207
210 portion of 203 facing radially outward, i.e. toward 205
211 portion of 230 facing radially inward, i.e. toward 204
212 direction of magnetization of 208

214 recess in 203 extending in axial direction of 200, i.e. perpendicularly into the plane of the drawing, which accommodates 207 and 208
215 air gaps at end faces of 209 in 207, which, due to V arrangement of 207, face substantially in the circumferential direction of 200
216 magnet pocket for accommodating 208
217 magnetically non-conductive spatial region for 216, which is disposed laterally with respect to 212 of 208
218 hook-type shape on end face of 209
219 lateral, rectangular air space, adjoining 214
250 rotor of 252
251 stator of 252
252 electric motor (FIG. 3)
253 rotor core of 250
254 rotor shaft of 250
255 air gap of 252 between 250 and 251
256 magnet pocket in 253 for 257
257 permanent magnet in 256
258 arrow: direction of magnetization of 257
300 rotor of 302
302 electric motor (FIG. 6)
303 rotor core of 300
350 rotor of 352
352 electric motor (FIG. 5)
353 rotor core of 350
N magnetic north pole of 108, 257
S magnetic south pole of 108, 257

The invention claimed is:

1. A rotor for an electric motor, the rotor comprising:
a magnetically conductive rotor core and a plurality of permanent magnets embedded in said rotor core, said rotor core having at least one flux path defined therein for conducting a magnetic flux caused by a magnetic stator field generated by a stator of the electric motor;
a plurality of magnetically conductive shunts formed in said rotor core for the at least one flux path, said at least one magnetically conductive shunt bridging said at least one permanent magnet for the magnetic flux caused by the stator field;
wherein at least some of said permanent magnets and at least some of said magnetically conductive shunts are arranged in a grouped combination to form respectively one permanent magnet group, and said permanent magnets that are arranged in combination to form respectively one permanent magnet group are disposed substantially rectilinearly in succession to form a row, and wherein said permanent magnets within said row have a direction of magnetization opposite to a direction of magnetization of an adjacent permanent magnet.

2. The rotor according to claim 1, wherein a direction of magnetization of said at least one permanent magnet is oriented substantially orthogonally to a direction of the magnetic flux, caused by the stator field, in at least one flux path adjacent the at least one permanent magnet.

3. The rotor according to claim 2, wherein the direction of magnetization of said at least one permanent magnet is orthogonal to the direction of the magnetic flux caused by the stator field in at least one flux path adjacent the at least one shunt of the flux path.

4. The rotor according to claim 1, wherein, within said row, the directions of magnetization of adjacent permanent magnets are reversed by substantially 180°.

5. The rotor according to claim 1, wherein one of said permanent magnets and one of said magnetically conductive shunts, respectively, are disposed alternately in each of said permanent magnet groups in succession along a substantially rectilinear row.

6. The rotor according to claim 1, wherein said permanent magnets and said magnetically conductive shunts are disposed alternately in each of said permanent magnet groups.

7. The rotor according to claim 1, wherein:
said rotor core is formed with at least one recess forming a magnet pocket for accommodating said at least one embedded permanent magnet; and
said magnet pocket is formed with a magnetically non-conductive spatial region that, with respect to a direction of magnetization of said at least one permanent magnet, when said at least one permanent magnet is in a proper mounting position in said magnet pocket, is disposed at a side of said permanent magnet.

8. The rotor according to claim 1, wherein:
said rotor core is formed with a plurality of recesses each forming a magnet pocket for accommodating a respective said at least one embedded permanent magnet;
each of said magnet pockets having at least one magnetically non-conductive spatial region that, with respect to a direction of magnetization of said at least one permanent magnet in said magnet pocket, is disposed at the side of this permanent magnet.

9. The rotor according to claim 8, wherein at least one of said magnet pockets is formed with a hook shape for guiding and/or holding said at least one permanent magnet in said magnet pocket and for mechanical support and/or load relief in said rotor core via said at least one permanent magnet.

10. An electric motor, comprising a stator and a rotor according to claim 1.

11. A traction device for driving a vehicle, the device comprising an electric motor having a stator and having a rotor according to claim 1.

12. A vehicle, comprising:
a traction device for driving the vehicle, said traction device being an electric motor with a stator and with a rotor according to claim 1.

13. The vehicle according to claim 12, configured as a road vehicle.

* * * * *